United States Patent [19]

Dolan

[11] Patent Number: 5,722,528
[45] Date of Patent: Mar. 3, 1998

[54] METHOD AND APPARATUS FOR CLEANING CONVEYOR BELTS

[75] Inventor: Troy D. Dolan, Latrobe, Pa.

[73] Assignee: Conveyor Services Corp., Blairsville, Pa.

[21] Appl. No.: 313,559

[22] Filed: Sep. 27, 1994

Related U.S. Application Data

[63] Continuation of Ser. No. 100,702, Jul. 30, 1993, abandoned, which is a continuation of Ser. No. 753,183, Aug. 30, 1991, abandoned.

[51] Int. Cl.⁶ .................................................. B65G 45/16
[52] U.S. Cl. .................................................. 198/499
[58] Field of Search .................................. 198/497, 499; 15/256.5, 256.51

[56] References Cited

U.S. PATENT DOCUMENTS

| Re. 31,249 | 5/1983 | Stahura | 198/525 |
|---|---|---|---|
| 3,994,384 | 11/1976 | Reiter | 198/497 |
| 4,105,109 | 8/1978 | Schultz | 198/499 |
| 4,236,628 | 12/1980 | Stahura | 198/525 |
| 4,269,301 | 5/1981 | Gibbs | 198/499 |
| 4,344,525 | 8/1982 | Bancroft et al. | 198/497 X |
| 4,533,036 | 8/1985 | Gordon | 198/499 |
| 4,598,823 | 7/1986 | Swinderman | 198/497 |
| 4,694,952 | 9/1987 | Meijer | 198/499 |
| 5,007,523 | 4/1991 | Morefield | 198/499 X |
| 5,016,746 | 5/1991 | Gibbs | 198/499 |

FOREIGN PATENT DOCUMENTS

| 0338118 | 10/1989 | European Pat. Off. | 198/497 |
|---|---|---|---|
| 0031926 | 2/1988 | Japan | 198/497 |

OTHER PUBLICATIONS

Martin CM Belt Cleaner—Form No. 3133–1183 GAAC.
Material Control—Model 99—Bulletin 99–H.
Martin Engineering Dirt Hawg—Form 3142–189 WP.
Martin Engineering—Durt Tracker—Form 3166–189WP.
Rema Tip Top—The Adjustable—2/1050–I. 89.
Material Control—Model 33 Bulletin 33–A.
Martin—Trac Mount Skirtboard—Form 3150–189 WP.
Safety Evaluation of Conveyor Belt Cleaning Systems Jan. 1983; Contract J0215015 Wyle Lab; Bureau of Mines.

*Primary Examiner*—James R. Bidwell
*Attorney, Agent, or Firm*—Bilicki & Simpson, PC

[57] ABSTRACT

Disclosed is a method and apparatus for cleaning a conveyor belt. The invention comprises locating a support bar under the return side of a conveyor belt and positioning it transverse to the direction of travel of the conveyor belt. The support bar has mounted on it several individual piston-cylinder apparatus which have pneumatic or hydraulic connections to a manifold assembly. Support plates are connected to the extensible end of the piston-cylinder apparatus and cleaner blades are removeably attached to the support plates. The cleaner blades and piston-cylinder apparatus are arranged adjacently with one another along the length of the support bar, and the blade assemblies have side edges with tongue and groove connections so that each adjacent cleaning blade has a sliding engagement with one another. Connecting to the manifold assembly on the support bar are pneumatic supply and return lines that emanate from a pressure source having a regulator and a two way valve. The method comprises locating the support bar assembly in the proper position and activating the two way valve so that pressure is applied to each of the individual piston cylinder apparatus. As wear occurs on the individual blades or as the conveyor belt becomes curved more in the middle, the blades are pressed against the belt in a uniform manner. When it is necessary to change the blades the two way valve may be switched and the piston cylinders are retracted from contact with the belt.

12 Claims, 5 Drawing Sheets

METHOD AND APPARATUS FOR CLEANING CONVEYOR BELTS

This is a continuation of application Ser. No. 08/100,702 filed on Jul. 7, 1993, which is a continuation of Ser. No. 07/783,183 filed on Aug. 30, 1997, both now abandoned.

BACKGROUND OF THE INVENTION

This invention has to do with a method and apparatus for the cleaning of conveyor belts and is especially concerned with an arrangement for cleaning conveyor belts for the material handling industry where the material has a tendency to stick to the belt after it has passed it's intended point of delivery and may be carried back on the underside of the looped belt.

Prior art devices that have attempted to solve the problem have included rotating brush assemblies mounted transverse to the direction of travel of the conveyor belt and spring mounted "doctor blade" assemblies as mentioned in prior U.S. Pat. No. 4,598,823.

The prior art devices all appear to involve mounting a brush or a blade on a transverse support bar that uniformly elevates or rotates so that all the brushes or blades become tensioned or move in response to the adjustment of the bar. The problem with many of the belts in service is that the loading of the material handled sometimes has a distribution that is heaviest in the middle of the belt and lightest on the sides of the belt. The uneven loading has two effects on the conveyor belt. First the belt can take on a concave curvature that then becomes convex when the belt is viewed from the under side of the conveyor. Further, the belt can wear more in the middle than on the sides, causing it to be thinner in cross section. These two effects do not seem to be taken into consideration by the prior art devices because the prior devices call for adjusting the support bar in response to the above situation, which in turn moves all the blades or brushes attached to the bar the same amount or adjusts the tension on the blades or brushes the same amount. Since the surface of the belt varies in location from the support bar due to the above conditions, the prior devices do not provide for any individual response by a single cleaning blade to the location of the surface of the belt it is intended to clean.

A further problem with the devices of the prior art is that in most cases the adjustment of the support bar must be accomplished at the end of the bar as it protrudes out from under the conveyor belt. In most cases this will not be a convenient area for a workman either because of the debris that may accumulate in the area or because the end of the belt is located in an inaccessible area.

BRIEF SUMMARY OF THE INVENTION

According to the present invention there is disclosed a conveyor belt cleaning arrangement which comprises an elongate support bar for transverse disposition to the direction of travel of a conveyor belt. Mounted on said support bar adjacent to one another are pneumatically or hydraulically controlled expansible and retractable piston cylinder apparatus with means for expanding and retracting the piston cylinder apparatus. A scraper blade support plate is attached to each piston cylinder apparatus and a scraper blade is mounted on each support plate with each blade having co-operating elements of sliding attachment means between the side edges of each adjacent cleaning blade.

Further according to the present invention the cleaner blade comprises a polygonal body having opposing side surfaces and a cleaning edge extending between the side surfaces. There is an abutment connecting surface on the blade body and means for connecting the body to a moveable support plate. Preferably the cleaner blade body abutment surfaces comprise right angle surfaces and a hole through the body having a longitudinal axis parallel to one of the right angle surfaces. Preferably the body is comprised of an elastomeric urethane material.

The present invention further contemplates the method of cleaning a conveyor belt surface which comprises forming a transverse support bar and locating individually operated piston-cylinder apparatus adjacent to one another along the support bar. Cleaning blades are then mounted on the ends of the piston-cylinder apparatus and a hydraulic actuating means is provided to extend and contract the piston cylinder apparatus. The support bar is then mounted under the return side of a looped conveyor belt and located transverse to the direction of travel of the conveyor belt. Once in position the method contemplates pressurizing the individual piston cylinder apparatus so that the individual cleaner blades contact the conveyor belt. Due to the individual nature of the cleaning blades uniform contact pressure is maintained across the width of the conveyor belt allowing for individual and automatic adjustable movement of the cleaner blades due to wear of either the blades themselves or the conveyor belt.

OBJECTS OF THE INVENTION

It is an object of the present invention to provide a more efficient cleaning arrangement for conveyor belts.

It is an object of the present invention to provide an easily adjustable blade cleaning arrangement for looped conveyor belt assemblies.

It is an object of the present invention to provide automatically adjustable cleaning blades for a conveyor belt.

It is an object of the present invention to provide interconnecting cleaning blades with a sliding connection.

It is a further object of the present invention to provide cleaning blade arrangements where each individual cleaning blade can be properly tensioned against the area of the conveyor belt it is supposed to contact and clean.

It is a further object of the present invention to provide a remote control for the proper adjusting of the cleaner blades against the conveyor belt.

It is a further object of the present invention to provide adjacent cleaning blades that interconnect with one another in a sliding engagement, providing full belt cleaning coverage with no gaps.

It is a still further object of the present invention to provide a shock mounted piston cylinder apparatus for mounting and continuously adjusting the tension of the cleaning blades.

It is a still further object of the present invention to provide a method and apparatus for remote monitoring and adjusting of the tension of the blades against the conveyor belt.

BRIEF DESCRIPTION OF THE DRAWINGS

FIG. 6 is a front view of a cleaning blade according to the present invention.

FIG. 7 is a side view of a cleaning blade according to the present invention.

FIG. 8 is a top view of the cleaning blade according to the present invention.

DETAILED DESCRIPTION OF THE INVENTION

Figure 1:
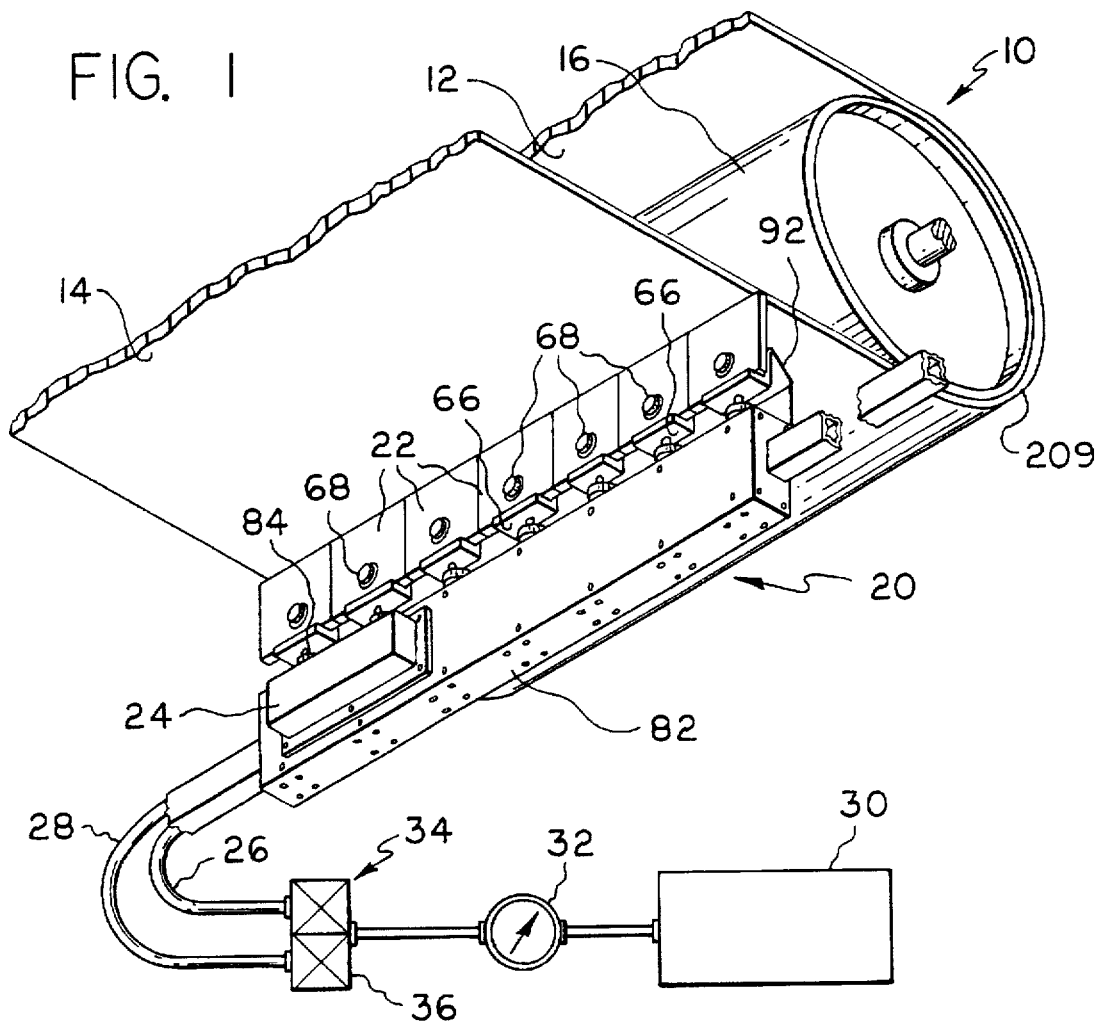
FIG. 1 is a perspective view of a belt cleaning apparatus according to the present invention.

What is shown in FIG. 1 is the discharge end of a typical conveyor belt assembly 10 having an upper conveyor belt portion 12 and a lower conveyor belt portion 14 that completes a loop around a roller 16. Normally the discharge end of the conveyor belt assembly 10, such as is shown in FIG. 1, may have a housing (not shown) surrounding the conveyor belt and drum with an access door (not shown) for inserting and removing a belt scraper assembly.

Shown in FIG. 1 is the belt scraper assembly 20 according to the present invention having scraper blades 22 contacting the belt portion 14 transversely across its direction of travel. The assembly 20 comprises a support bar arrangement 82 which has a manifold assembly 24 that connects with a supply line 26 and a return line 28 for supplying pneumatic or hydraulic pressure to the support bar manifold 24. A common pressure source 30 is shown providing the pneumatic or hydraulic pressure through a pressure regulator 32 to a two-way valve 34. The two-way valve 34 has a pressure relief means 36 so that positioning the valve may send pneumatic pressure down lines 26 or 28 depending on how one would want to position the cleaning blades 22. The regulator 32 is preferrably adjustable within a range of 0 to 100 psig.

Figure 2:
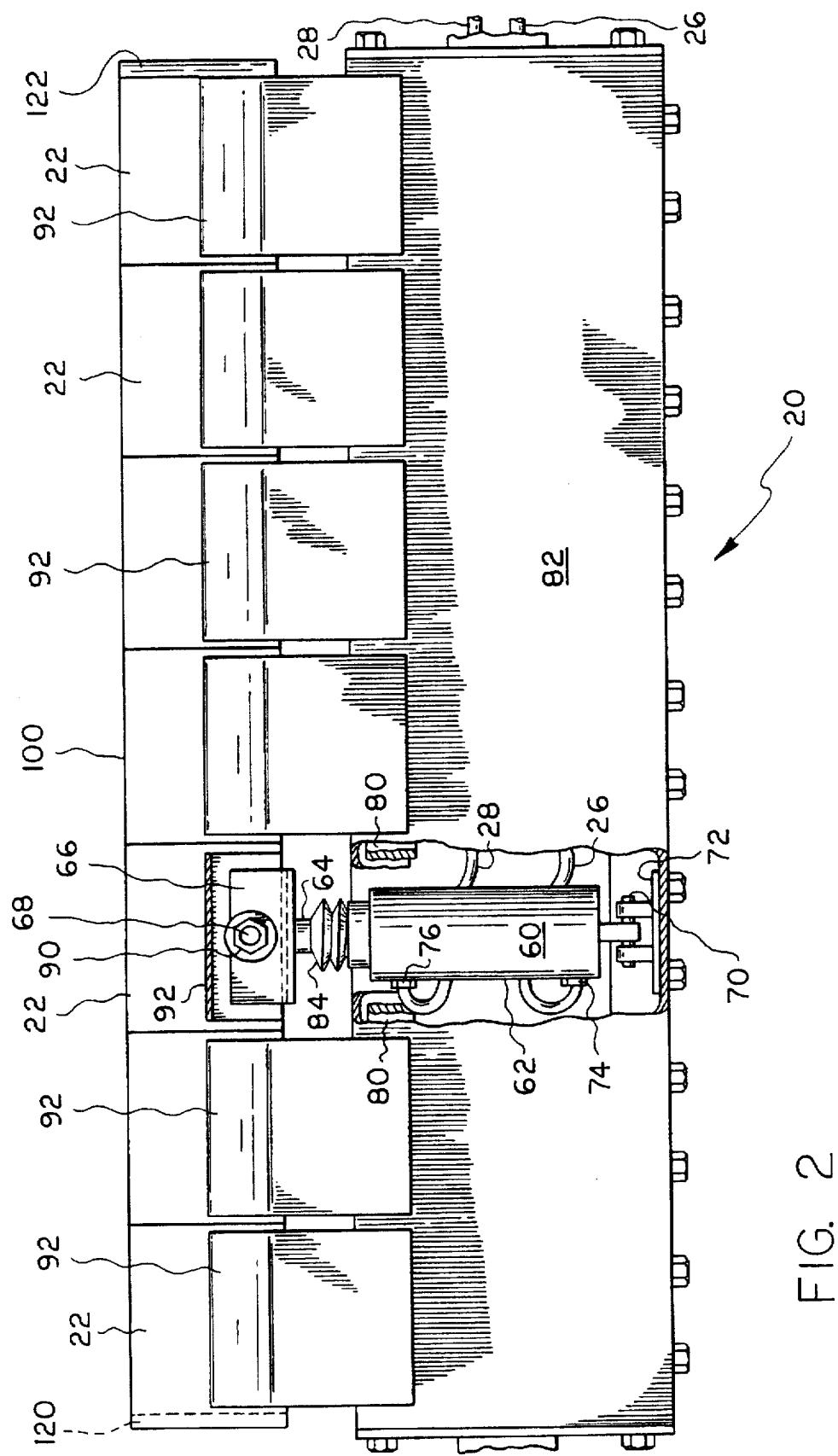
FIG. 2 is a front view of a support bar assembly according to the present invention.

Shown in FIG. 2 is a front view of a support bar 82 having assembled thereon the piston cylinder apparatus 60 with the associated supply lines 26 and 28 shown connecting to the ports 74 and 76. Through this arrangement it is intended that the advancement and the retraction of the cleaning blade 22 will be achieved by positioning the two way valve shown in FIG. 1 so that pressure down line 26 (and 28 correspondingly relieved through 36) will advance the cleaner blades into contact with the conveyor belt. Conversely, pressure down line 28 (and 26 correspondingly relieved through 36) will cause the cleaner blades to be retracted from contact with the conveyor belt.

Figure 3:
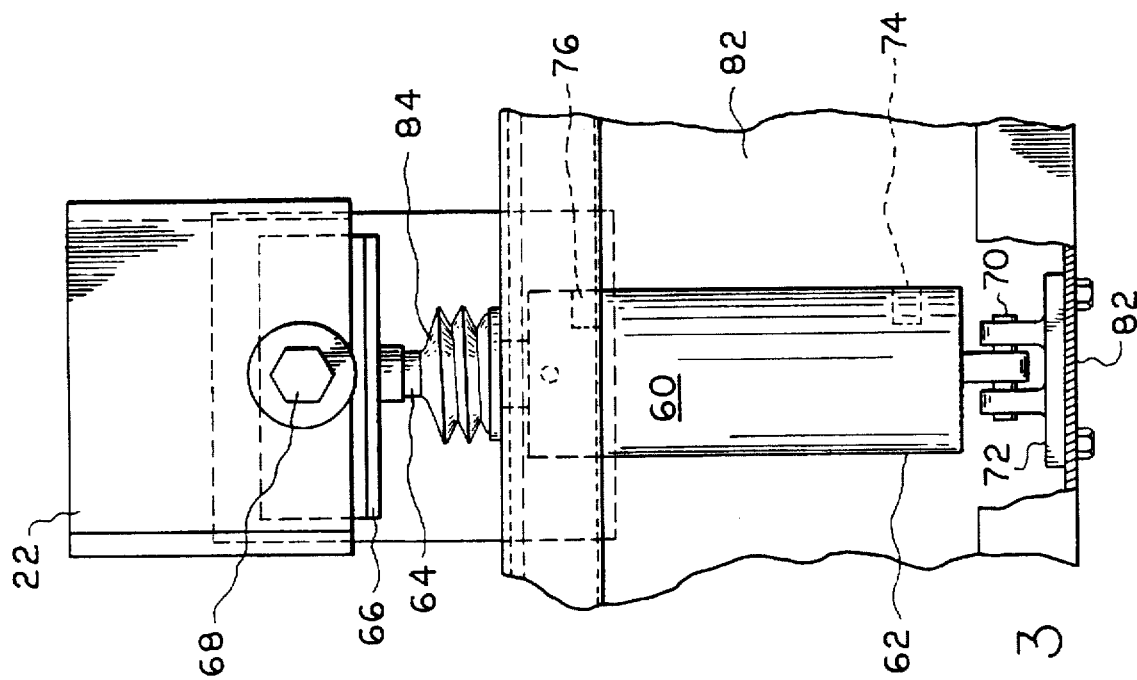
FIG. 3 is a piston-cylinder arrangement according to the present invention.

Shown in FIG. 3 is a piston cylinder apparatus 60 that is expansible and retractable having a cylinder body 62 and a piston end 64 shown in a retracted position. The piston end 64 is shown connected to a cleaning blade support plate 66 which in turn has mounted on it a cleaning blade 22. Bolt means shown at 68 are used to hold the cleaning blade 22 to the support plate 66. The piston-cylinder body 62 is shown having a pivotal connection 70 to a mount 72 that is firmly attached to the support bar 82. Shown also on the piston-cylinder body 62 is an inlet 74 and an outlet 76 that provides either a supply or return line from either side of the piston 64 to apply up or down movement to piston 64.

Figure 4:
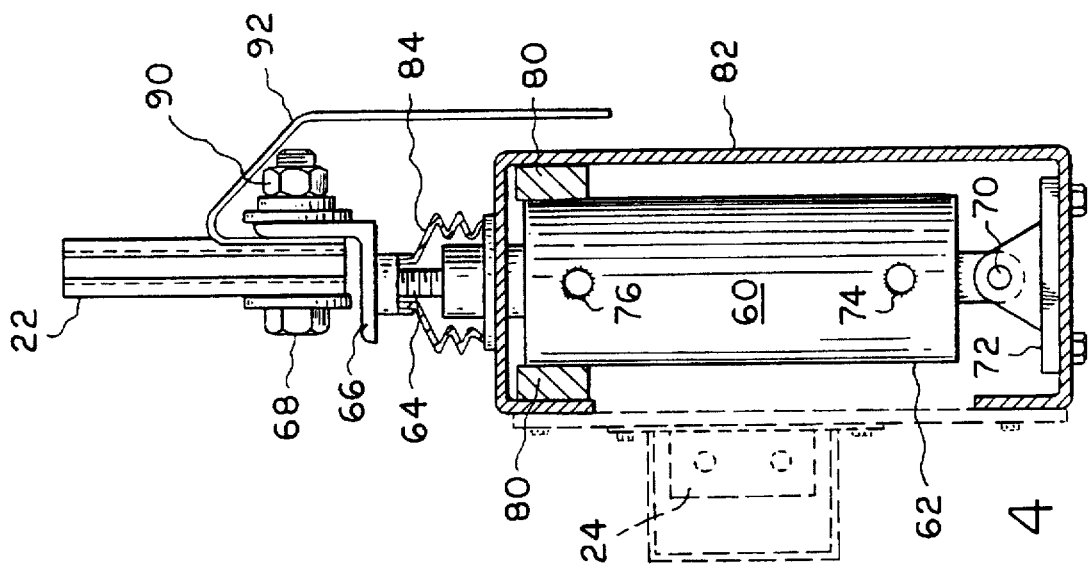
FIG. 4 is a side view of a piston-cylinder arrangement according to the present invention.

Shown in FIG. 4 is again the piston cylinder assembly 60 having the cylinder body 62 shown mounted pivotally at 70 on one end and at the upper end having, preferably rubber, shock mounts 80 located between the cylinder body 62 and portions of frame 82. The piston end 64 is shown covered with a protective covering 84 (preferrably rubber) that will help keep the piston cylinder apparatus free from any dirt or grit that may come into contact with the extended piston during its operation. The cleaning blade 22 is shown having bolt 68 extend through a hole 86 (shown in FIG. 9) in the cleaning blade 22 and attached to a nut 90 so as to be able to hold the cleaning blade 22 to the support plate 66. A debris shield 92 is shown also attached between the support plate 66 and the cleaning blade 22 by bolt 68 and the nut 90.

Figure 5:
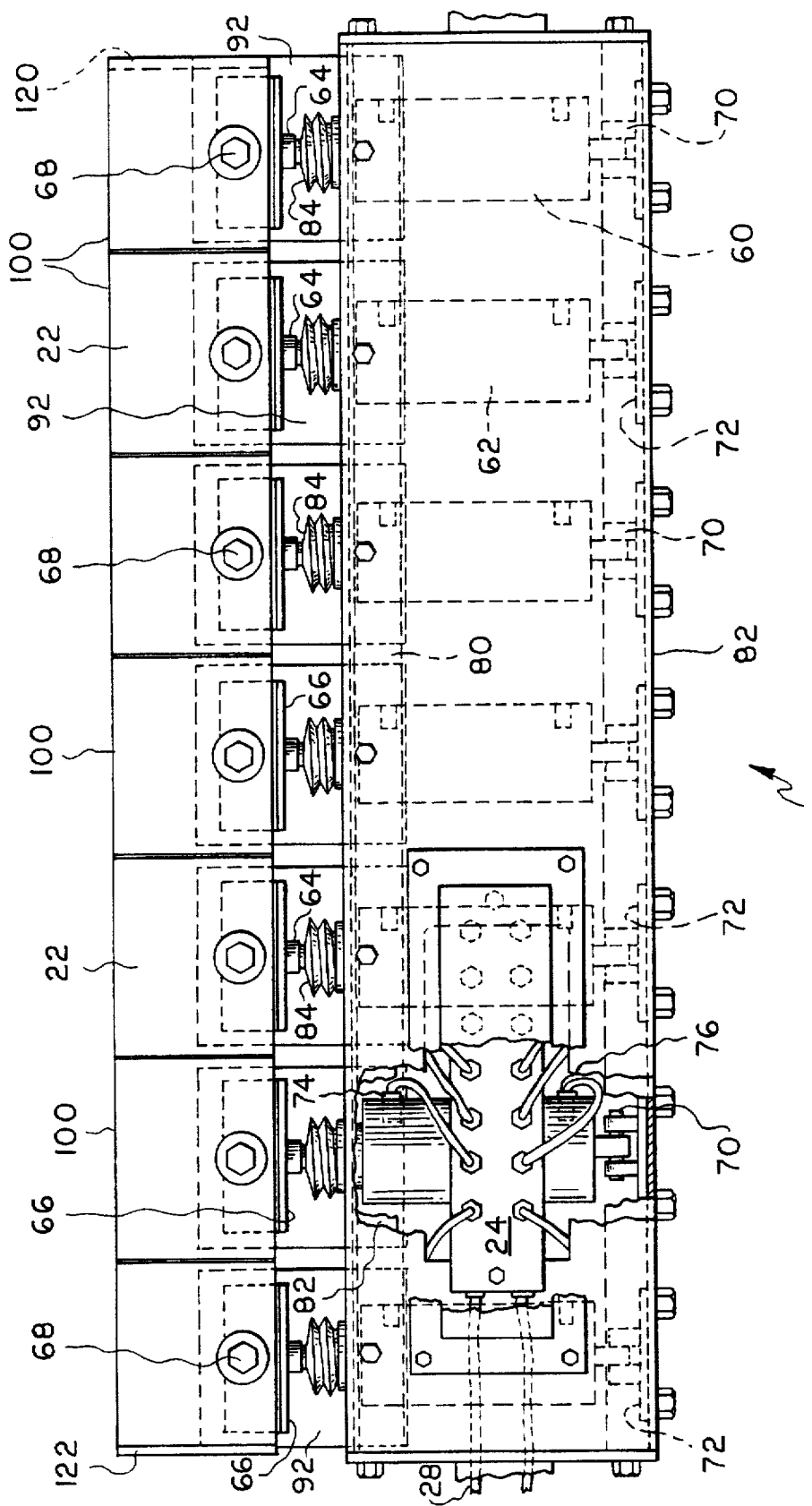
FIG. 5 is a back view of a support bar arrangement with adjacent piston-cylinders according to the present invention.

Shown in FIG. 5 is a scraper blade assembly 20 according to the present invention having the piston cylinders 60 pivotally mounted, as shown at 70, transversely along the length of the support bar 82. Cleaning blades 22 are shown in an adjacent relationship with one another and may comprise any desired number so as to be able to clean the entire width of a conveyor belt.

Shown in FIG. 6 is a cleaning blade 22 which is preferably in the form of a rectangle and having a cleaning edge 100 extending between two opposing side edges 102 and 104. Preferrably the cleaner blades are comprised of a rubber or suitable plastic material but they may also in certain instances take the form of a steel material, a carbide material, or a composite material of steel, carbide, rubber or plastic material.

As shown in FIG. 7 the cleaning blade 22 has a front face 106 and a back face 108 that are joined peripherally by side edges 110 and it is to be understood that the cleaning blade 22 may have a polygonal shape when viewed as in FIG. 6, although preferably as shown in FIG. 6 the cleaning blade 22 is a rectangular polygon.

Shown in FIG. 8 is the cleaning blade 22 showing the configuration of side edges 102 and 104. On side 102 is shown a groove 120 and shown on side 104 is a tongue 122. The groove 120 and the tongue 122 form cooperating elements of sliding attachment between adjacently located cleaning blades 22.

Figure 9:
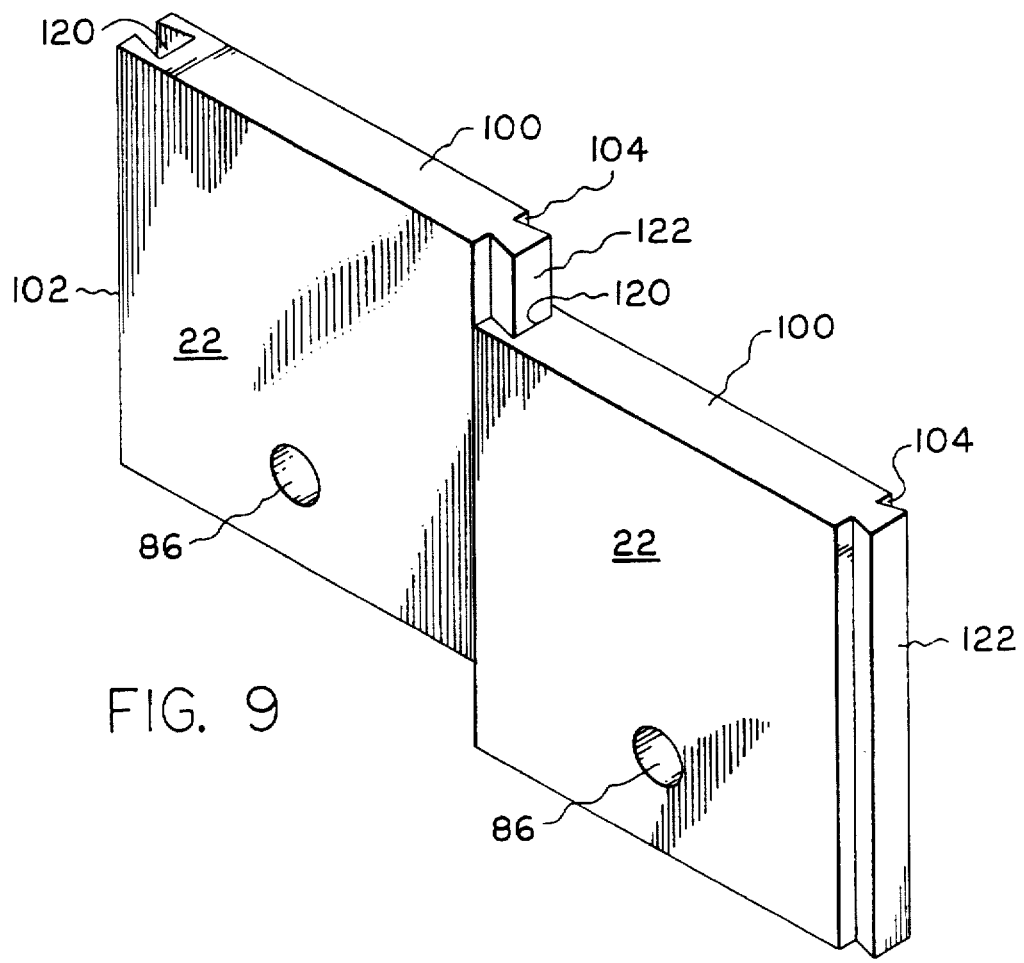
FIG. 9 is a perspective view of a co-operating pair of cleaning blades according to the present invention.

Shown in FIG. 9 is a perspective view of adjacently located cleaning blades 22 having a cooperating tongue 122 and grove 120 connected so that the height of one cleaning blade 22 may be different than the adjacent cleaning blade 22. Thus, with the upper portions of the cleaning blade 22 having the cleaning edge 100 the sliding connections 120 and 122 may provide for individual height adjustments between the adjacent cleaning blades 22.

Figure 10:
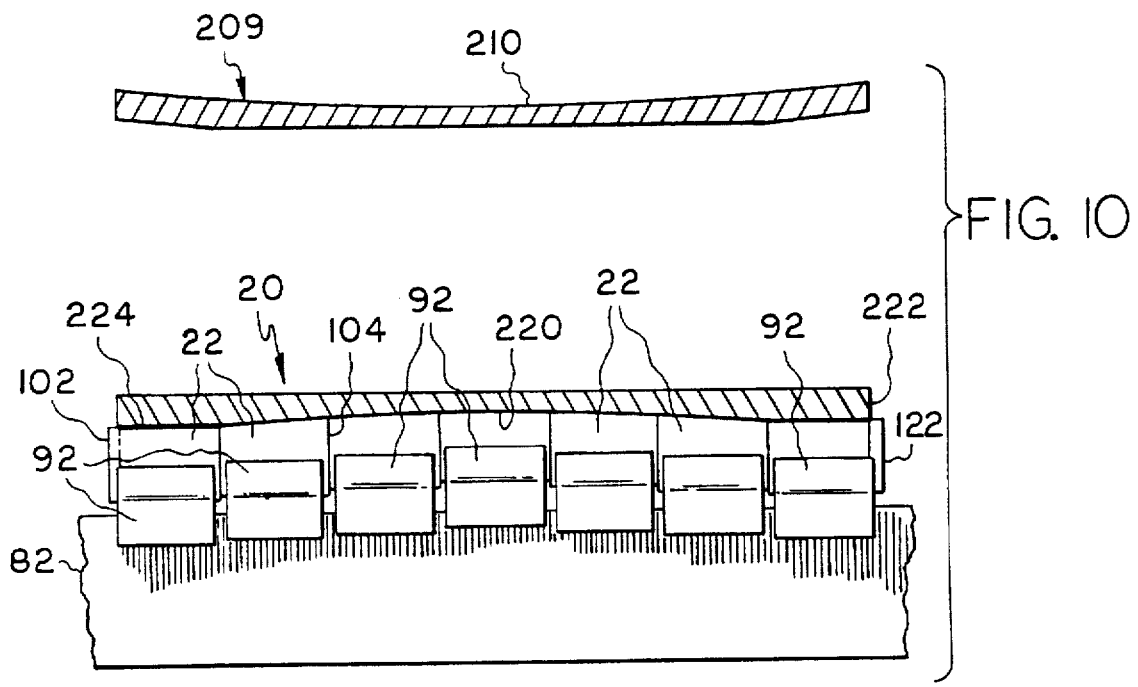
FIG. 10 is a sectional view of the engagement of a conveyor belt with the blade cleaning arrangement of the present invention.

Shown in FIG. 10 is a representative cross section of a concave belt 210 having a convex configuration 220 on the underside of the conveyor assembly. The distribution of the convex configuration 220 is shown distributed from the edges 222 to the other edge 224 of the conveyor belt 209 shown therein.

An advantange of the present invention is that the individual cleaner blades 22 may be advanced into closer engagement with the belt 210 than has been previously possible. With the prior art, single unit cleaner blades that extended across the entire width of the belts, the outer ends 222 and 224, tended to wear more rapidly as the contact pressure between the unitized blades and the belt was increased to clean the center of the belt. As can been seen in FIG. 10, the individual cleaner blades 22 will more evenly contact the belt 210 across its width with the same contact pressure across the width of the belt. As the blades 22 become worn, they may even assume complimentary cleaning edges 100 with the undersided configurated 220 of the belt 210.

It has been found through experimentation that the piston-cylinder assemblies have a longer life if they are mounted so as to be able to pivot back and forth from the direction of travel of the conveyor belt.

Other objects and further scope of applicability of the present invention will become apparent to those in the art from the detailed description given herein and it is to be understood that the description given herein are the preferred embodiments of the invention and that various changes and modifications may be made that are within the spirit and scope of the present invention.

I claim:

1. A conveyor belt cleaning arrangement which comprises:
   a. an elongate support bar for transverse disposition to the direction of travel of a conveyor belt;
   b. individual expansible and retractable piston-cylinder apparatus mounted adjacently to one another along said support bar;
   c. means for expanding and retracting said piston-cylinder apparatus;
   d. a scraper blade support plate attached to one end of each of said piston-cylinder apparatus;
   e. scraper blades removeably attached to said scraper blade support plates;
   f. co-operating elements of sliding attachment means between adjacent sides of said scraper blades.

2. The conveyor belt cleaning arrangement according to claim 1 in which said means for expanding and retracting said piston-cylinder apparatus comprises a pneumatic pressure source; a manifold assembly having connecting lines to each side of said piston in said piston-cylinder apparatus; and a switching arrangement for supplying pressure to one side of said piston when in a first position and the other side of said piston in a second position.

3. The conveyor belt cleaning arrangement according to claim 1 in which said co-operating elements of sliding attachment means between the sides of said scraper blades comprises co-operating elements of a tongue and groove connection between the sides of adjacent scraper blades.

4. The conveyor belt cleaning arrangement according to claim 2 in which said co-operating elements of sliding attachment means between the sides of said scraper blades comprises co-operating elements of a tongue and groove connection between the sides of adjacent scraper blades.

5. The conveyor belt cleaning arrangement according to claim 1 in which said scraper blades comprise a polygonal body having opposing side edges and a cleaning edge extending between the side edges, and an abutment surface for contacting said support plate.

6. The conveyor belt cleaning arrangement according to claim 5 in which said abutment surface for contacting said support plate comprises a right angled abutment surface.

7. The conveyor belt cleaning arrangement according to claim 1 in which one end of each said piston cylinder apparatus is shock mounted to said support bar and the other end of each said piston cylinder is pivotally mounted to said support bar.

8. The conveyor belt cleaning arrangement according to claim 5 in which said cleaning edge of said scraper blade is comprised of a more wear resistant material than said body.

9. The conveyor belt cleaning arrangement according to claim 1 in which said means for expanding and retracting said piston-cylinder apparatus comprises a hydraulic pressure source; a manifold assembly having connecting lines to each side of said piston in said piston-cylinder apparatus; and a switching arrangement for supplying pressure to one side of said piston when in a first position and the other side of said piston in a second position.

10. The method of cleaning a conveyor belt which comprises:
   a. forming a transverse support bar;
   b. locating individual expansible and retractable piston-cylinder apparatus adjacent to one another along said support bar;
   c. mounting cleaning blades on the ends of said piston-cylinder apparatus;
   d. providing a pneumatically activated means to extend and contract said piston-cylinder apparatus;
   e. mounting said support bar under the return side of a looped conveyor belt;
   f. providing a pressure source remote from the location of said support bar;
   g. providing a switching arrangement to select either expansion or retraction of said piston-cylinder apparatus
   h. adjusting the pressure and switching arrangement so that each cleaner blade properly engages said belt.

11. The method of cleaning a conveyor belt according to claim 10 which further comprises adjusting the switching arrangement so that the cleaner blades are retracted when the cleaner blades need replacement.

12. A conveyor belt cleaning blade which comprises:
   a. a polygonal body having opposing front and back surfaces with side edges joining said front and back surfaces;
   b. a pair of opposing side edges being substantially parallel to one another;
   c. a cleaning edge extending between said parallel edges;
   d. co-operating elements of dovetail and groove connections on each parallel edge for connection to a co-operating element of an adjacently located cleaning blade;
   e. means for connecting said body to a moveable support plate.

* * * * *